United States Patent
Kim et al.

(10) Patent No.: US 12,531,096 B2
(45) Date of Patent: Jan. 20, 2026

(54) PAGE BUFFER PERFORMING MEMORY OPERATION

(71) Applicant: SK hynix Inc., Gyeonggi-do (KR)

(72) Inventors: Dong Ho Kim, Gyeonggi-do (KR); Tae Hun Park, Gyeonggi-do (KR); Yeong Jo Mun, Gyeonggi-do (KR); Dong Hun Kwak, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 272 days.

(21) Appl. No.: 18/366,676

(22) Filed: Aug. 8, 2023

(65) Prior Publication Data

US 2024/0274171 A1    Aug. 15, 2024

(30) Foreign Application Priority Data

Feb. 9, 2023   (KR) .................. 10-2023-0017361

(51) Int. Cl.
*G11C 7/12*     (2006.01)
*G11C 7/10*     (2006.01)
*G11C 7/14*     (2006.01)

(52) U.S. Cl.
CPC ............... *G11C 7/12* (2013.01); *G11C 7/106* (2013.01); *G11C 7/14* (2013.01)

(58) Field of Classification Search
CPC ...................................................... G11C 7/12
See application file for complete search history.

(56) References Cited

U.S. PATENT DOCUMENTS 10,790,028 B1*  9/2020  Yeh .................. G11C 5/02
2023/0215502 A1*  7/2023  Yeh ................ G11C 16/26
                                                        365/207

FOREIGN PATENT DOCUMENTS

| KR | 10-2015-0010134 A | 1/2015 |
| KR | 10-2015-0020430 A | 2/2015 |
| KR | 10-2017-0048855 A | 5/2017 |
| KR | 10-2021684 B1     | 9/2019 |
| KR | 10-2019-0122061 A | 10/2019 |
| KR | 10-2020-0139496 A | 12/2020 |
| KR | 10-2022-0036467 A | 3/2022 |

\* cited by examiner

*Primary Examiner* — Douglas King
(74) *Attorney, Agent, or Firm* — IP & T GROUP LLP

(57) ABSTRACT

The present technology relates to a page buffer performing memory operation. According to the present technology, a page buffer may include a bit line voltage control circuit, a latch and a reference voltage supply circuit. The bit line voltage control circuit may selectively connect a bit line and a sensing node. The latch may provide a latch signal corresponding to data and an inverted latch signal. The reference voltage supply circuit may include a first PMOS transistor and a first NMOS transistor coupled in series between the sensing node and a ground voltage terminal, and apply a first reference voltage to the sensing node. The first PMOS transistor may be controlled according to the reference voltage control signal. The first NMOS transistor may be controlled by the inverted latch signal.

11 Claims, 8 Drawing Sheets

PAGE BUFFER PERFORMING MEMORY OPERATION

CROSS-REFERENCE TO RELATED APPLICATION

The present application claims priority under 35 U.S.C. § 119(a) to Korean patent application number 10-2023-0017361 filed on Feb. 9, 2023, the entire disclosure of which is incorporated by reference herein.

BACKGROUND

1. Field of Invention

Embodiments of the present disclosure relate to a page buffer, and more particularly, to a page buffer internally generating a reference voltage required for a memory operation.

2. Description of Related Art

A page buffer is a device that is connected to a memory cell and stores data in the memory cell or reads data stored in the memory cell. The page buffer may store or read data in or from the memory cell using a reference voltage level applied to a sensing node.

SUMMARY

Embodiments of the present disclosure provide a page buffer capable of internally generating a reference voltage used for a memory operation.

According to an embodiment of the present disclosure, a page buffer may include a bit line voltage control circuit, a latch and a reference voltage supply circuit. The bit line voltage control circuit may selectively connect a bit line and a sensing node. The latch may provide a latch signal corresponding to data and an inverted latch signal. The reference voltage supply circuit may include a first PMOS transistor and a first NMOS transistor coupled in series between the sensing node and a ground voltage terminal, and apply a first reference voltage to the sensing node. The first PMOS transistor may be controlled according to the reference voltage control signal. The first NMOS transistor may be controlled by the latch signal.

According to an embodiment of the present disclosure, a page buffer may include a bit line voltage control circuit, a latch and a switch circuit. The bit line voltage control circuit may selectively connect a bit line and a sensing node. The latch may provide a latch signal corresponding to data. The switch circuit, which is coupled to the sensing node through a first NMOS transistor and a second NMOS transistor coupled in series, may be coupled to a power voltage terminal or a ground voltage terminal based on a switch control signal. The first NMOS transistor is controlled based on a latch transfer signal. The second NMOS transistor is controlled based on the latch signal.

According to an embodiment of the present disclosure, a page buffer may include a bit line voltage control circuit, a latch, a reference voltage supply circuit and a switch circuit. The bit line voltage control circuit may selectively connect a bit line and a sensing node. The latch may provide a latch signal corresponding to data and an inverted latch signal. The reference voltage supply circuit may apply a first reference voltage to the sensing node. The switch circuit coupled to the sensing node, and may be coupled to a power voltage terminal or a ground voltage terminal based on a switch control signal. The reference voltage supply circuit includes a first PMOS transistor and a first NMOS transistor coupled in series between the sensing node and a ground voltage terminal. The first PMOS transistor is controlled based on a reference voltage control signal. The first NMOS transistor is controlled based on the inverted latch signal. The switch circuit is coupled to the sensing node through a second NMOS transistor and a third NMOS transistor coupled in series. The second NMOS transistor is controlled based on a latch transfer signal. The third NMOS transistor is controlled based on the latch signal.

According to the present technology, a page buffer internally generating a reference voltage used for a memory operation is provided.

DETAILED DESCRIPTION

Specific structural or functional descriptions of embodiments according to the concepts which are disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
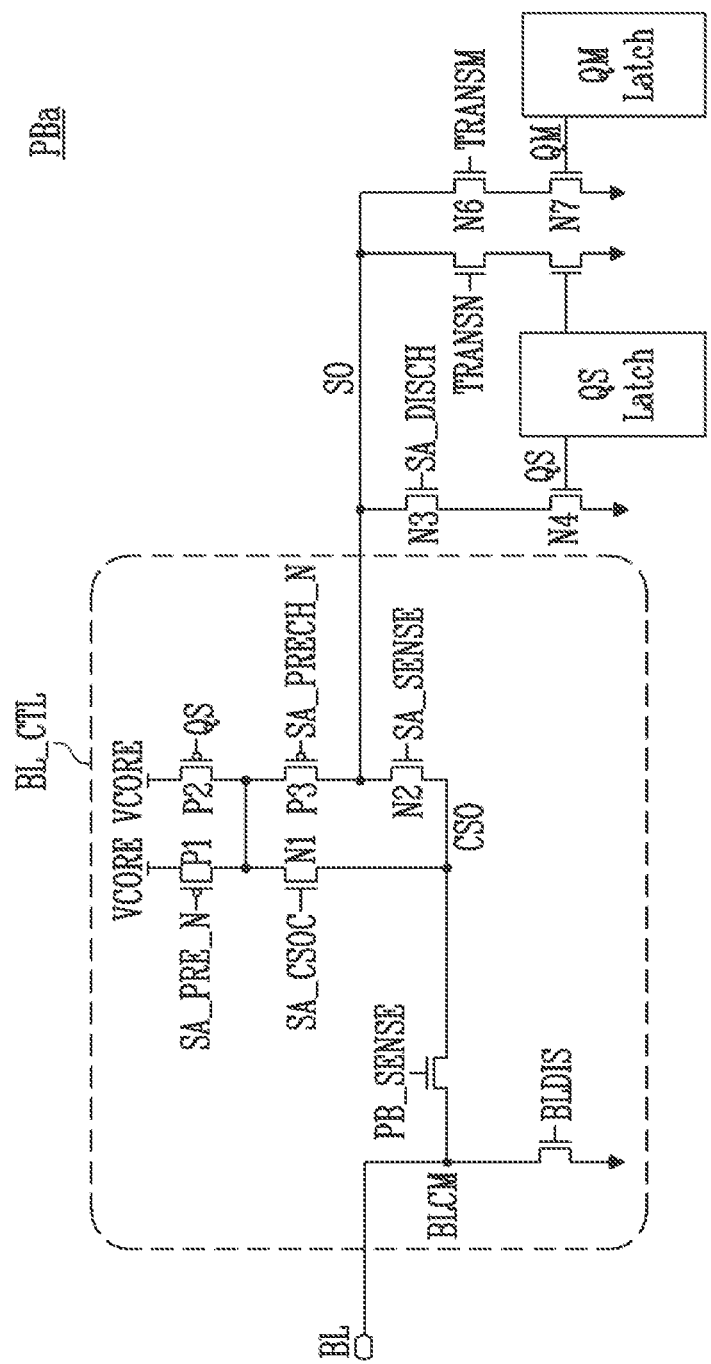
FIG. 1 is a diagram illustrating a page buffer according to an embodiment of the present disclosure.

FIG. 1 is a diagram illustrating a page buffer PBa according to an embodiment of the present disclosure.

Referring to FIG. 1, the page buffer PBa may include a bit line voltage control circuit BL_CTL and first and second latches QS Latch and QM Latch.

The bit line voltage control circuit BL_CTL may selectively connect a bit line BL and a sensing node SO. The bit line BL may be connected to a memory cell. The bit line voltage control circuit BL_CTL may transfer a voltage applied to the sensing node SO to the bit line BL during a program operation or transfer a voltage applied to the bit line BL to the sensing node SO during a read operation.

The first latch QS Latch may store data of '1' or '0' according to a level of voltage applied to the sensing node SO during the read operation. The first latch QS Latch may set the level of voltage applied to the sensing node SO to a logic high or a logic low according to a value of data stored therein during the program operation.

The second latch QM Latch may transfer data received from an outside to the first latch QS Latch or transfer the data received through the first latch QS Latch to the outside.

Figure 2:
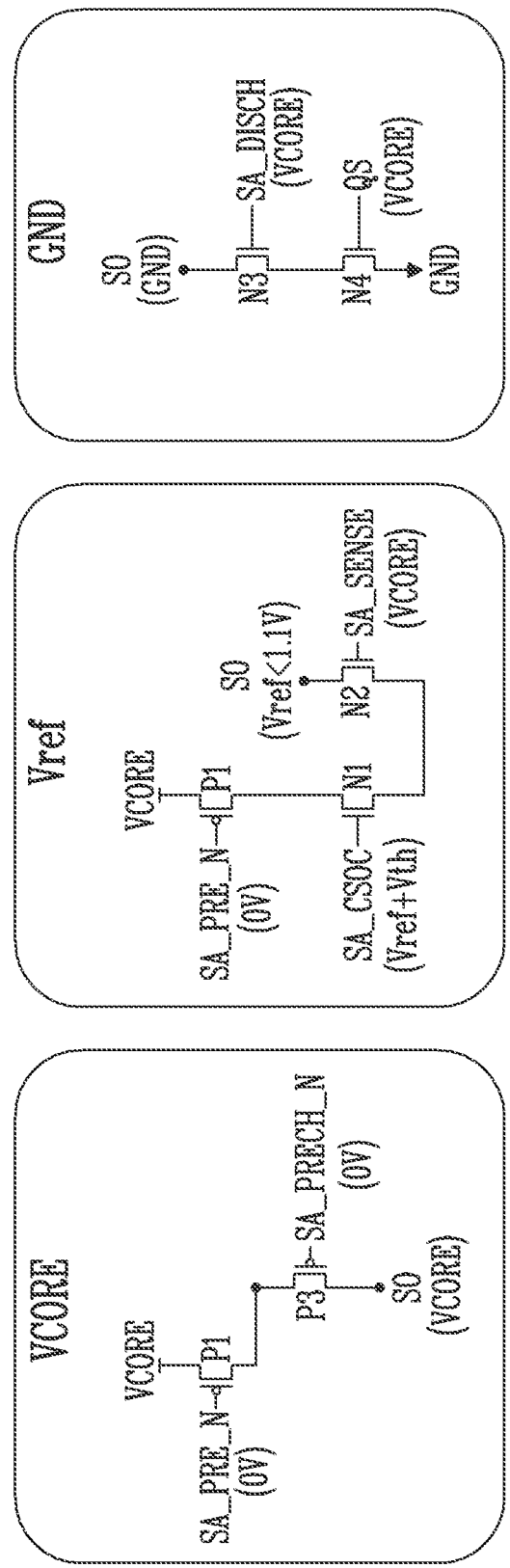
FIG. 2 is a diagram for describing an operation of applying voltages to a sensing node in the page buffer of FIG. 1.

FIG. 2 is a diagram for describing an operation of applying voltages to the sensing node SO in the page buffer PBa of FIG. 1.

Referring to FIGS. 1 and 2, a PMOS transistor P1 and a PMOS transistor P3 may be turned on to apply a power voltage VCORE to the sensing node SO. Specifically, a signal SA_PRE_N having a level of a ground voltage GND (i.e., 0V) may be applied to the PMOS transistor P1. A signal SA_PRECH_N having the level of the ground voltage GND (i.e., 0V) may be applied to the PMOS transistor P3.

In order to apply a reference voltage Vref to the sensing node SO, the PMOS transistor P1, an NMOS transistor N1, and an NMOS transistor N2 may be turned on. Specifically, the signal SA_PRE_N having the level of the ground voltage GND (i.e., 0V) may be applied to the PMOS transistor P1. A signal SA_CSOC having a voltage level obtained by adding a level of a threshold voltage Vth of the NMOS transistor N1 to a level of the reference voltage Vref may be applied to the NMOS transistor N1. A signal SA_SENSE having a level of the power voltage VCORE may be applied to the NMOS transistor N2. In FIG. 2, a maximum level of the reference voltage Vref may be less than 1.1V.

In order to apply a ground voltage GND to the sensing node SO, an NMOS transistors N3 and an NMOS transistors N4 may be turned on. The ground voltage GND may be 0V. Specifically, a signal SA_DISCH having the level of the power voltage VCORE may be applied to the NMOS transistor N3. A latch signal QS having the level of the power voltage VCORE may be applied to the NMOS transistor N4.

The bit line voltage control circuit BL_CTL described with reference to FIG. 1 may apply the power voltage VCORE, the reference voltage Vref, or the ground voltage GND to the sensing node SO as described with reference to FIG. 2.

Figure 3:
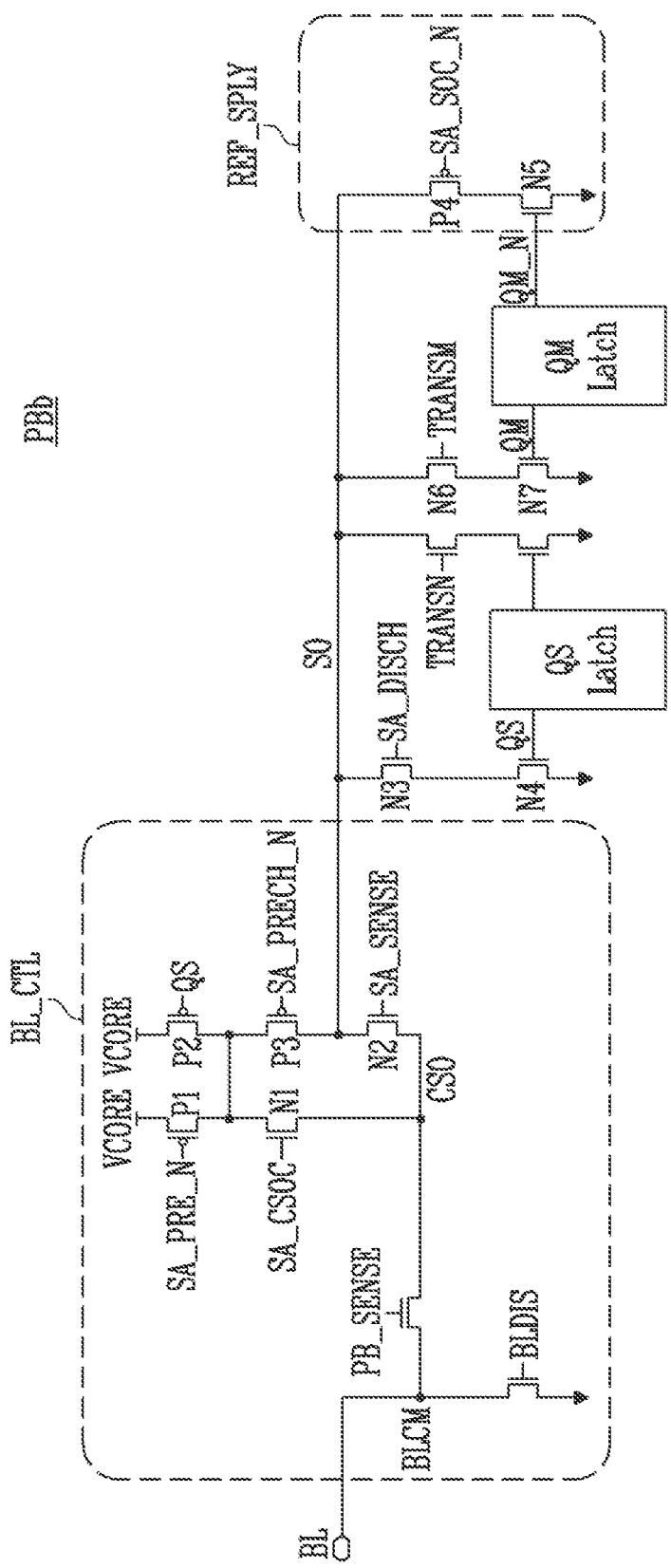
FIG. 3 is a diagram illustrating a page buffer according to an embodiment of the present disclosure.

FIG. 3 is a diagram illustrating a page buffer PBb according to an embodiment of the present disclosure.

Referring to FIG. 3, the page buffer PBb may include the bit line voltage control circuit BL_CTL, a reference voltage supply circuit REF_SPLY, and the first and second latches QS Latch and QM Latch. The page buffer PBb may further include the reference voltage supply circuit REF_SPLY in addition to the page buffer PBa shown in FIG. 1.

A configuration and an operation of the bit line voltage control circuit BL_CTL are the same as those described with reference to FIG. 1.

The reference voltage supply circuit REF_SPLY may include a PMOS transistor P4 and an NMOS transistor N5 connected in series between the sensing node SO and a ground voltage GND terminal. The PMOS transistor P4 may be controlled by a reference voltage control signal SA_SOC_N. The NMOS transistor N5 may be controlled by an inverted latch signal QM_N.

Figure 4:
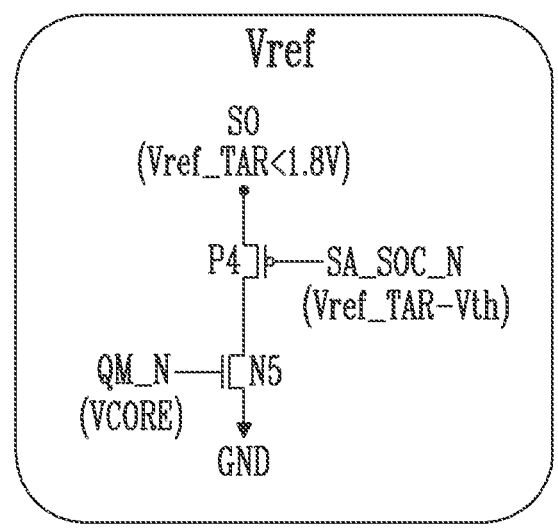
FIG. 4 is a diagram for describing an operation of applying a voltage to a sensing node in the page buffer of FIG. 3.

FIG. 4 is a diagram for describing an operation of applying a voltage to the sensing node in the page buffer of FIG. 3.

Referring to FIGS. 3 and 4, the PMOS transistor P4 and the NMOS transistor N5 may be turned on to apply a target reference voltage Vref_TAR to the sensing node SO. Specifically, a reference voltage control signal SA_SOC_N having a voltage level obtained by subtracting a level of a threshold voltage Vth of the PMOS transistor P4 from a level of a target reference voltage Vref_TAR may be applied to the PMOS transistor P4. The inverted latch signal QM_N having the level of the power voltage VCORE may be applied to the NMOS transistor N5. In FIG. 4, a maximum level of the target reference voltage Vref_TAR may be less than 1.8V.

The page buffer PBb may apply a reference voltage of a level higher than that of the page buffer PBa described with reference to FIG. 1 to the sensing node SO. For example, the maximum level of the reference voltage Vref applied to the sensing node SO in the page buffer PBa may be 1.1V, but the maximum level of the target reference voltage Vref_TAR applied to the sensing node SO in the page buffer PBb may be 1.8V.

Therefore, in a case of the page buffer PBa, in order to apply the reference voltage Vref higher than 1.1V to the sensing node SO, a separate high voltage HV generation circuit is required. However, since the page buffer PBb may apply the target reference voltage Vref_TAR higher than 1.1V to the sensing node SO through the reference voltage supply circuit REF_SPLY, the separate high voltage HV generation circuit is not required. In the page buffer PBb, a maximum level of the reference voltage applied to the sensing node SO may be increased.

That is, the page buffer PBb may apply the target reference voltage Vref_TAR having a level higher than the level of the reference voltage Vref to the sensing node SO without the separate high voltage HV generation circuit. The target reference voltage Vref_TAR applied to the sensing node SO may be transferred to a channel region of a memory cell connected to the bit line BL through the bit line voltage control circuit BL_CTL. The target reference voltage Vref_TAR transferred to the channel region of the memory cell may be used to adjust a program speed of the memory cell.

Figure 5:
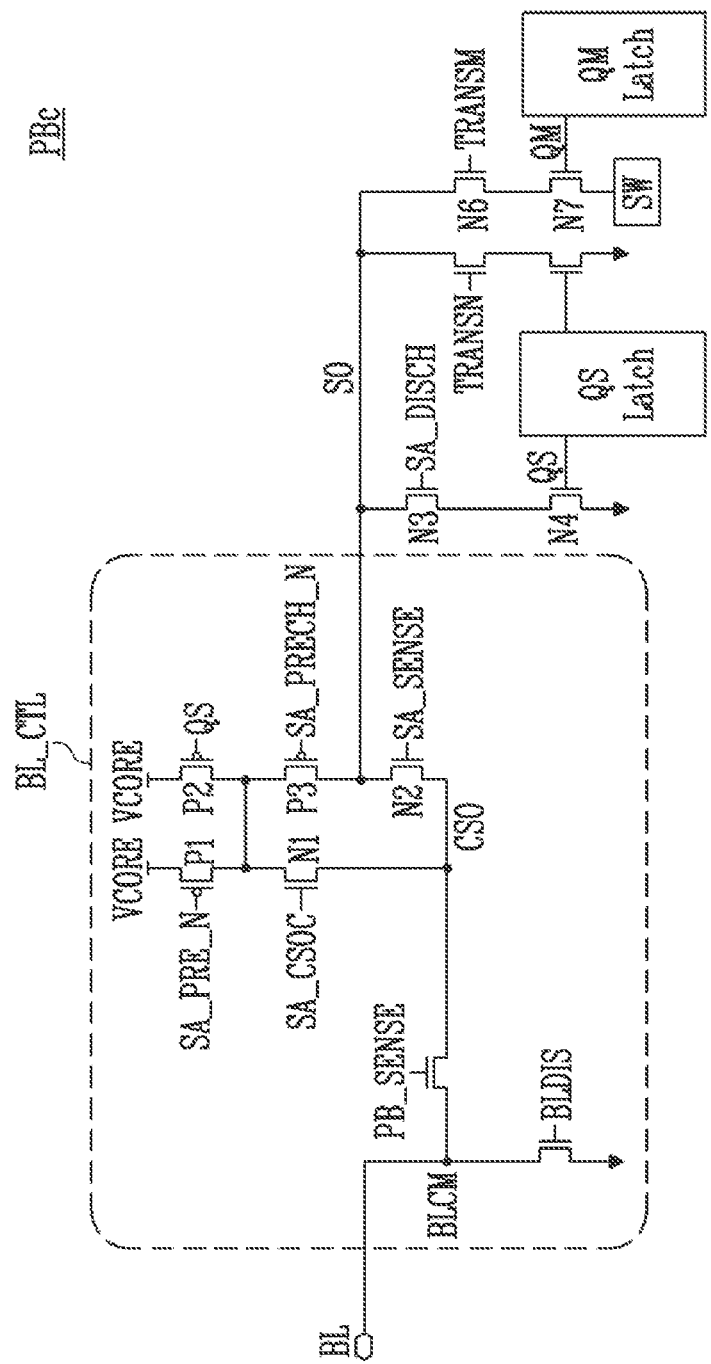
FIG. 5 is a diagram illustrating a page buffer according to an embodiment of the present disclosure.

FIG. 5 is a diagram illustrating a page buffer PBC according to an embodiment of the present disclosure.

Referring to FIG. 5, the page buffer PBc may include the bit line voltage control circuit BL_CTL, a switch circuit SW, and the first and second latches QS Latch and QM Latch. That is, the page buffer PBc may further include the switch circuit SW in addition to the page buffer PBa shown in FIG. 1.

A configuration and an operation of the bit line voltage control circuit BL_CTL are the same as those described with reference to FIG. 1.

The switch circuit SW may be connected to the sensing node SO through an NMOS transistor N6 and an NMOS transistor N7 connected in series. The switch circuit SW may be connected to a power voltage VCORE terminal or a ground voltage GND terminal according to a switch control signal. The NMOS transistor N6 may be controlled according to a latch transfer signal TRANSM. The NMOS transistor N7 may be controlled according to a latch signal QM.

Figure 6:
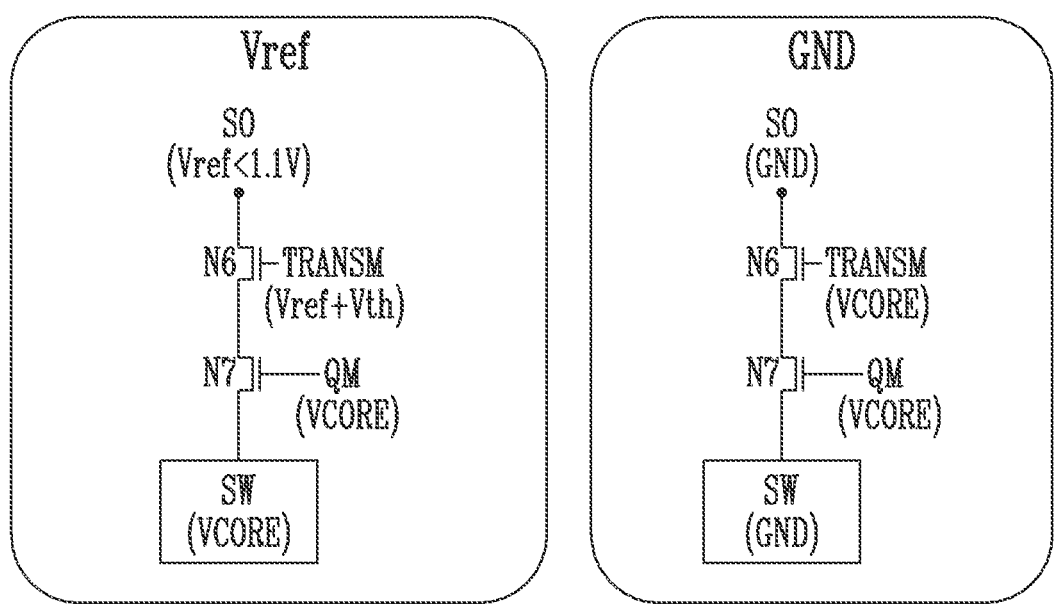
FIG. 6 is a diagram for describing an operation of applying a voltage to a sensing node in the page buffer of FIG. 5.

FIG. 6 is a diagram for describing an operation of applying a voltage to the sensing node in the page buffer of FIG. 5.

Referring to FIGS. 5 and 6, an NMOS transistors N6 and an NMOS transistors N7 may be turned on to apply the reference voltage Vref to the sensing node SO. Specifically, a latch transfer signal TRANSM having a voltage level obtained by adding a level of a threshold voltage Vth of the NMOS transistor N6 to the level of the reference voltage Vref may be applied to the NMOS transistor N6. The latch signal QM having the level of the power voltage VCORE may be applied to the NMOS transistor N7.

In order to apply the ground voltage GND to the sensing node SO, the NMOS transistors N6 and the NMOS transistors N7 may be turned on. Specifically, the latch transfer signal TRANSM having the level of the power voltage VCORE may be applied to the NMOS transistor N6. The latch signal QM having the level of the power voltage VCORE may be applied to the NMOS transistor N7.

When compared to the page buffer PBa described with reference to FIG. 1, the page buffer PBc may apply the reference voltage Vref to the sensing node SO without using the bit line voltage control circuit BL_CTL. Therefore, the bit line voltage control circuit BL_CTL may perform another operation while the reference voltage Vref is applied to the sensing node SO by applying the reference voltage Vref to the sensing node SO through the switch circuit SW instead of the bit line voltage circuit BL_CTL.

Alternatively, since a transistor required for the bit line voltage control circuit BL_CTL to apply the reference voltage Vref to the sensing node SO may be removed, the area of the page buffer PBc may be less than that of the page buffer PBa.

Figure 7:
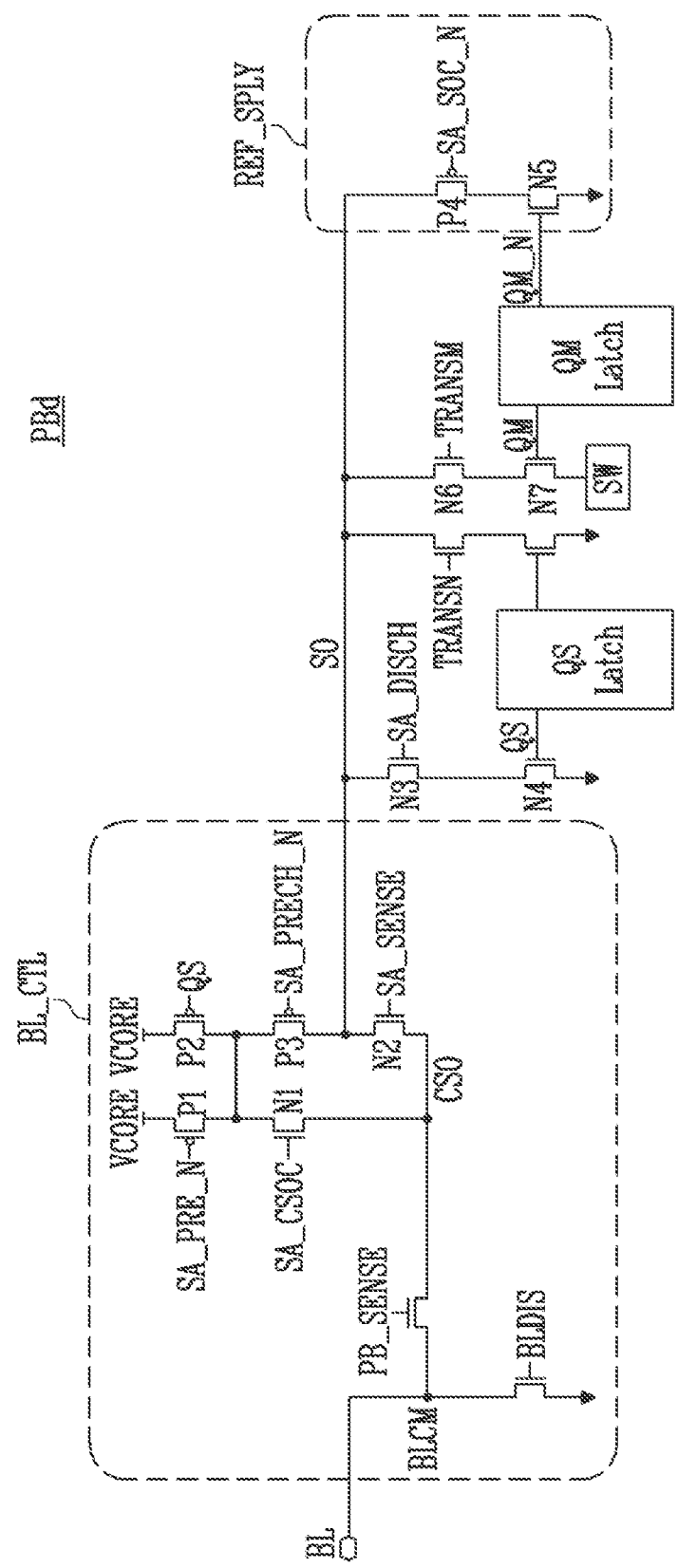
FIG. 7 is a diagram illustrating a page buffer according to an embodiment of the present disclosure.

FIG. 7 is a diagram illustrating a page buffer PBd according to an embodiment of the present disclosure.

Referring to FIG. 7, the page buffer PBd may include the bit line voltage control circuit BL_CTL, the reference voltage supply circuit REF_SPLY, the switch circuit SW, and the first and second latches QS Latch and QM Latch. The page buffer PBd may further include the switch circuit SW and the reference voltage supply circuit REF_SPLY in addition to the page buffer PBa shown in FIG. 1.

As described above, the level of the reference voltage applied to the sensing node SO of the page buffer PBd may be increased and the total area of the page buffer PBd may be reduced.

Figure 8:
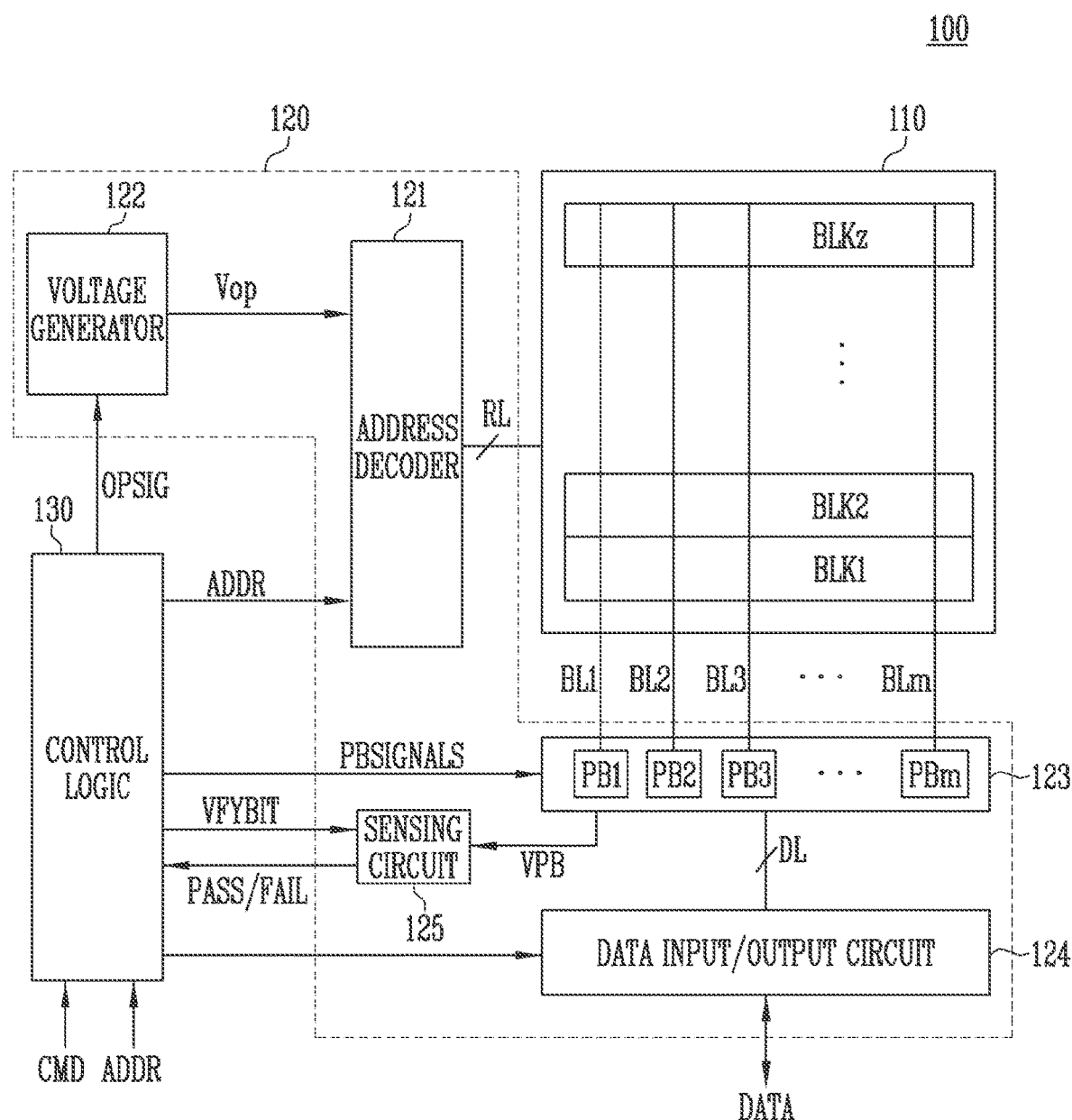
FIG. 8 is a diagram illustrating a memory device including a page buffer according to an embodiment of the present disclosure.

FIG. 8 is a diagram illustrating a memory device 100 including a page buffer according to an embodiment of the present disclosure.

Referring to FIG. 8, the memory device 100 may include a memory cell array 110, a peripheral circuit 120, and a control logic 130.

The memory cell array 110 may include a plurality of memory blocks BLK1 to BLKz. The plurality of memory blocks BLK1 to BLKz may be connected to an address decoder 121 through row lines RL. The plurality of memory blocks BLK1 to BLKz may be connected to a read and write circuit 123 through bit lines BL1 to BLm. Each of the plurality of memory blocks BLK1 to BLKz may include a plurality of memory cells.

The peripheral circuit 120 may include the address decoder 121, a voltage generator 122, the read and write circuit 123, a data input/output circuit 124, and a sensing circuit 125. The peripheral circuit 120 may drive the memory cell array 110 to perform, for example, a program operation, a read operation, and an erase operation.

The address decoder 121 may be connected to the memory cell array 110 through the row lines RL. The row lines RL may include drain select lines, word lines, source select lines, and a common source line. The address decoder 121 may operate in response to control of the control logic 130. The address decoder 121 may receive an address ADDR from the control logic 130.

The address decoder 121 may decode a block address of the received address ADDR. The address decoder 121 may select at least one memory block among the memory blocks BLK1) to BLKz according to the decoded block address. The address decoder 121 may decode a row address of the received address ADDR. The address decoder 121 may select at least one word line among word lines of a selected memory block according to the decoded row address. The address decoder 121 may apply an operation voltage Vop generated from the voltage generator 122 to the selected word line.

During the program operation, the address decoder 121 may apply a program voltage to a selected word line and apply a program pass voltage of a level less than that of the program voltage to unselected word lines. During a program verify operation, the address decoder 121 may apply a verify voltage to the selected word line and apply a verify pass voltage of a level higher than that of the verify voltage to the unselected word lines.

During the read operation, the address decoder 121 may apply a read voltage to the selected word line and apply a read pass voltage having a level greater than that of the read voltage to the unselected word lines.

During the erase operation, the address decoder 121 may apply a ground voltage to the word lines connected to the selected memory block.

According to an embodiment of the present disclosure, the address decoder 121 may decode a column address of the transferred address ADDR. The decoded column address may be transferred to the read and write circuit 123. As an example, the address decoder 121 may include a component such as a row decoder, a column decoder, and an address buffer.

The voltage generator 122 may generate a plurality of operation voltages Vop by using an external power voltage supplied to the memory device 100. The voltage generator 122 may operate under the control of the control logic 130.

In an embodiment, the voltage generator 122 may generate internal power voltages by regulating the external power voltage. The internal power voltages generated by the voltage generator 122 may be used as an operation voltage of the memory device 100. For example, the voltage generator 122 may generate a plurality of erase voltages, a plurality of program voltages, a plurality of pass voltages, a plurality of selection read voltages, and a plurality of non-selection read voltages.

The read and write circuit 123 includes first to m-th page buffers PB1 to PBm. In an embodiment, the first to m-th page buffers PB1 to PBm may include the configuration of the page buffer PBa, PBb, PBc, or PBd illustrated in FIG. 1, 3, 5, or 7.

The first to m-th page buffers PB1 to PBm are connected to the memory cell array 110 through first to m-th bit lines BL1 to BLm, respectively. The first to m-th page buffers PB1 to PBm operate under the control of the control logic 130.

The first to m-th page buffers PB1 to PBm communicate data DATA with the data input/output circuit 124. At a time of program, the first to m-th page buffers PB1 to PBm receive the data DATA to be stored through the data input/output circuit 124 and data lines DL.

During the program operation, when a program voltage is applied to the selected word line, the first to m-th page buffers PB1 to PBm may transfer the data DATA received through the data input/output circuit 124 to the selected memory cells through the bit lines BL1 to BLm. The memory cells of the selected page are programmed according to the transferred data DATA. A threshold voltage of a memory cell connected to a bit line to which a program allowable voltage (for example, a ground voltage) is applied may increase. A threshold voltage of a memory cell connected to a bit line to which a program inhibit voltage (for example, the power voltage VCORE) is applied may be maintained.

During the program verify operation, the first to m-th page buffers PB1 to PBm read the data DATA stored in the memory cells from the selected memory cells through the bit lines BL1 to BLm.

During the read operation, the read and write circuit 123 may read the data DATA from the memory cells of the selected page through the bit lines BL1 to BLm and store the read data DATA in the first to m-th page buffers PB1 to PBm.

During the erase operation, the read and write circuit 123 may float the bit lines BL1 to BLm.

The data input/output circuit 124 may be connected to the first to m-th page buffers PB1 to PBm through the data lines DL. The data input/output circuit 124 may operate under the control of the control logic 130.

The data input/output circuit 124 may include a plurality of input/output buffers (not shown) that receive input data DATA. During the program operation, the data input/output circuit 124 may receive the data DATA to be stored from an external controller. During the read operation, the data input/output circuit 124 may output the data DATA transferred from the first to m-th page buffers PB1 to PBm included in the read and write circuit 123 to the external controller.

During the read operation or the verify operation, the sensing circuit 125 may generate a reference current in response to a signal of an allowable bit VFYBIT generated by the control logic 130 and compare a sensing voltage VPB received from the read and write circuit 123 with a reference voltage generated according to the reference current to output a pass signal or a fail signal to the control logic 130.

The control logic 130 may be connected to the address decoder 121, the voltage generator 122, the read and write circuit 123, the data input/output circuit 124, and the sensing circuit 125. The control logic 130 may control operations of the memory device 100. The control logic 130 may operate in response to a command CMD transferred from an external device.

The control logic 130 may generate various signals in response to the command CMD and the address ADDR to control the peripheral circuit 120. For example, the control logic 130 may generate an operation signal OPSIG, the address ADDR, a read and write circuit control signal PBSIGNALS, and the allowable bit VFYBIT in response to the command CMD and the address ADDR. The control logic 130 may output the operation signal OPSIG to the voltage generator 122, output the address ADDR to the address decoder 121, output the read and write control signal to the read and write circuit 123, and output the allowable bit VFYBIT to the sensing circuit 125. In addition, the control logic 130 may determine whether the verify operation is passed or failed in response to the pass or fail signal PASS/FAIL output by the sensing circuit 125.

What is claimed is:

1. A page buffer comprising:
a bit line voltage control circuit configured to selectively connect a bit line and a sensing node, and to provide data to or from the bit line through the sensing node;
a latch configured to provide a latch signal corresponding to the data and an inverted latch signal; and
a reference voltage supply circuit including a first PMOS transistor and a first NMOS transistor coupled in series between the sensing node and a ground voltage terminal, and configured to apply a first reference voltage to the sensing node,
wherein the first PMOS transistor is controlled based on a reference voltage control signal, and
the first NMOS transistor is controlled based on the inverted latch signal.

2. The page buffer of claim 1, wherein
the bit line voltage control circuit is configured to transfer the first reference voltage to a channel of a memory cell connected to the bit line.

3. The page buffer of claim 1,
wherein the reference voltage control signal has a level of a voltage obtained by subtracting a level of a threshold voltage of the PMOS transistor from a level of the first reference voltage, and
wherein the inverted latch signal has a level of a power voltage.

4. The page buffer of claim 1,
wherein the bit line voltage control circuit includes a second PMOS transistor and a second NMOS transistor coupled in series between a power voltage terminal and a common sensing node, and
wherein the bit line voltage control circuit is configured to apply a second reference voltage lower than the first reference voltage to the common sensing node by controlling the second PMOS transistor and the second NMOS transistor, and transfer the second reference voltage to the sensing node.

5. The page buffer of claim 4,
wherein the bit line voltage control circuit further includes a third NMOS transistor connecting the common sensing node and the sensing node, and
wherein the bit line voltage control circuit is configured to transfer the second reference voltage applied to the common sensing node to the sensing node by controlling the third NMOS transistor.

6. A page buffer comprising:
a bit line voltage control circuit configured to selectively connect a bit line and a sensing node, and to provide data to or from the bit line through the sensing node;
a latch configured to provide a latch signal corresponding to the data; and
a switch circuit coupled to the sensing node through a first NMOS transistor and a second NMOS transistor coupled in series, and configured to be coupled to a power voltage terminal or a ground voltage terminal based on a switch control signal,
wherein the first NMOS transistor is controlled based on a latch transfer signal, and
the second NMOS transistor is controlled based on the latch signal.

7. The page buffer of claim 6, wherein when the switch circuit is coupled to the power voltage terminal, a reference voltage is applied to the sensing node.

8. The page buffer of claim 7,
wherein the latch transfer signal has a voltage level obtained by adding a level of a threshold voltage of the first NMOS transistor to a level of the reference voltage, and
wherein the latch signal has a level of a power voltage.

9. The page buffer of claim 6, wherein when the switch circuit is coupled to the ground voltage terminal, a ground voltage is applied to the sensing node.

10. The page buffer of claim 9,
wherein the latch transfer signal has a level of a power voltage, and
wherein the latch signal has the level of the power voltage.

11. A page buffer comprising:
a bit line voltage control circuit configured to selectively connect a bit line and a sensing node, and to provide data to or from the bit line through the sensing node;
a latch configured to provide a latch signal corresponding to the data and an inverted latch signal;
a reference voltage supply circuit configured to apply a first reference voltage to the sensing node; and
a switch circuit coupled to the sensing node, and configured to be coupled to a power voltage terminal or a ground voltage terminal based on a switch control signal, wherein:
the reference voltage supply circuit includes a first PMOS transistor and a first NMOS transistor coupled in series between the sensing node and a ground voltage terminal;
the first PMOS transistor is controlled based on a reference voltage control signal;
the first NMOS transistor is controlled based on the inverted latch signal;
the switch circuit is coupled to the sensing node through a second NMOS transistor and a third NMOS transistor coupled in series;
the second NMOS transistor is controlled based on a latch transfer signal; and
the third NMOS transistor is controlled based on the latch signal.

* * * * *